Feb. 1, 1944. K. R. DOWNER 2,340,369
BUTTER MEASURE
Filed March 27, 1943
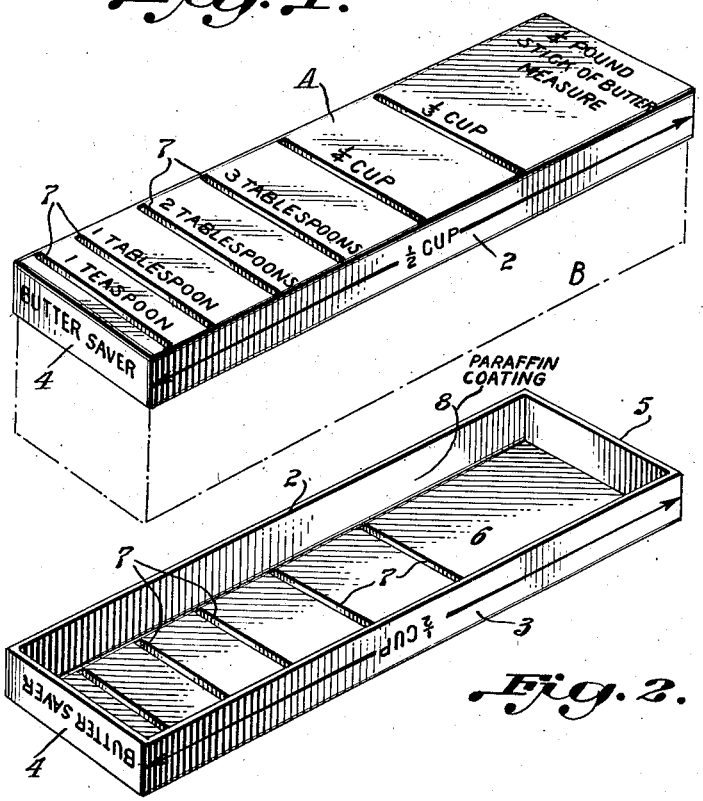
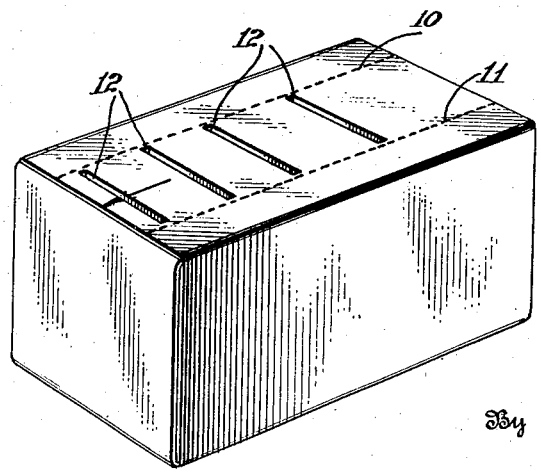
Inventor
Katherine R. Downer
By Harry Lea Dodson
Attorney Patented Feb. 1, 1944

2,340,369

UNITED STATES PATENT OFFICE 2,340,369

BUTTER MEASURE

Katherine R. Downer, Villa Nova, Pa.

Application March 27, 1943, Serial No. 480,759

4 Claims. (Cl. 31—32)

My invention relates to devices for measuring solids and is shown applied to butter as it is supplied to the customer on one quarter pound bars.

Owing to the shortage of this commodity in the market it is highly desirable to provide some simple inexpensive device by the use of which the housewife may quickly and accurately ascertain the desired amount of the butter needed and avoid all waste.

I am aware that there have been devices designed for this purpose such for instance as United States Patent No. 2,141,901 to Burleigh, December 27, 1938.

This device is objectionable because it must be made of material, metal, strong enough not only to permit it to be forced through the butter (page 1 lines 35 to 42) but if made of cardboard the tongues would quickly break or tear off also. It is also well known that butter will adhere to such a device, which is wasteful.

My invention has for its principal object to avoid these objectional features and produce a device which can be made of cardboard, which is coated so that the butter will not adhere to it, and which will not have any tongues to break or tear off. At the present time butter is sold in one-quarter pound bars. The preferred form of my device may be likened to a box lid the inside of which is coated with paraffin or its equivalent. The device is of the size to fit snugly over the quarter pound bar of butter. The top is provided with a number of slots at spaced intervals to indicate various amounts of butter. The user can take a spatula and score the bar of butter, and since the device is coated on the inside it can be easily lifted off of the bar without the butter adhering to it. The required amount may then be cut from the bar without any inaccuracy and consequently no loss.

My means of accomplishing the foregoing object may be more readily understood by reference to the accompanying drawing which is hereunto annexed and forms a part of this specification in which:

Fig. 1 is a perspective view of the device applied to a bar of butter;

Fig. 2 is a perspective view showing the inside of the device, and

Fig. 3 is a modified form.

Similar reference numerals refer to similar parts throughout the entire specification.

As shown in the drawing the device A is lid-like, and preferably is formed of cardboard. The device has side walls 2 and 3, end walls 4 and 5, and a top 6. The end and side walls, 4 and 5, and 2 and 3 respectively, are spaced to receive a quarter of a pound of butter. The top 6 is provided with a plurality of slots 7 which are preferably spaced to indicate various measurements such as, a teaspoonful, a tablespoonful, two tablespoons, three tablespoons, one quarter of a cup, and one-third cup.

It will be clear that the particular designation and location of the slots 7, may be varied as desired, and to suit the commodity to be subdivided. The entire inner surface is provided with a coating 8 of paraffin or any other wax-like substance to overcome any tendency of the butter to adhere to the lid.

The device is to be used in the following manner: If the commodity B is butter, indicated by the dotted lines in Fig. 1, the bar is placed on its side upon a suitable flat surface and the device A, is placed over it. A spatula or other suitable tool is passed through which ever one of the slots 7 indicates the desired amount of butter which is required, and the butter is scored. The device is then removed which is made easy by the coating of wax on its inner surface. The portion indicated by the scoring is then cut off the bar, and there is no loss, and a correct measurement is assured.

While I have described my device as specifically applied to a bar of butter it will be apparent to persons skilled in the art that it can be utilized for any other commodity which one desires to divide into predetermined portions.

In Fig. 3 I have shown a standard container for one pound of butter. In this form I score on one of the sides of the container preferably the top longitudinal lines 10 and 11, which correspond to the width of a quarter of a pound bar of butter. Transverse lines or slots 12 are formed between the longitudinal lines 10 and 11. These lines or slots are spaced as are the slots 7. When the user wishes to measure she can cut, fold or break the side of the box along the scored lines 10 and 11 and she will have an accurate measure comprising a flat strip of cardboard corresponding in width and length to a quarter pound bar of butter. Since the standard container or box for butter is already waxed the cut out portion may be used at once.

Having described my invention what I regard as new and desire to secure by Letters Patent is:

1. A cardboard device adapted to snugly fit a bar of butter, said device having top, side, and end walls, and a coating of paraffin on the inside of said device, the top having a plurality of spaced slots terminating at the side walls, said slots being adapted to indicate various predetermined amounts of butter.

2. A cardboard device adapted to snugly fit a bar of butter, said device having top, side, and end walls, and a coating of paraffin on the inside of said device, the top having a plurality of spaced slots terminating at the side walls, said slots being adapted to indicate various predetermined amounts of butter, the slot nearest the end wall being spaced therefrom to indicate an amount of the bar equaling 1 teaspoonful, then next a tablespoonful, then two and three tablespoonfuls respectively, then one quarter cup and one third cup respectively.

3. A measuring device consisting of a strip of cardboard provided with sides, said strip having one surface coated with paraffin and having a plurality of transverse spaced slots therein, said slots terminating within the sides of the strip.

4. A box to contain a pound of butter, one side having longitudinal lines scored thereon and spaced to correspond to the width of a quarter pound of butter, said side having a plurality of spaced slots intermediate said longitudinal lines, said slots being spaced to indicate different amounts of the bar equalling one teaspoon, one tablespoon, then two and three tablespoonfuls, a quarter of a cup, and one third cup respectively.

KATHERINE R. DOWNER.